United States Patent [19]

Stillhard et al.

[11] 3,728,053
[45] Apr. 17, 1973

[54] APPARATUS FOR THE INJECTION MOLDING OF PLASTIC OBJECTS

[76] Inventors: Bruno J. Stillhard, Wildeggstr. 38, 9000 Saint Gallen; Fredy Z. Scheifele, im Grund, 9244 Niederuzwil, both of Switzerland

[22] Filed: Aug. 26, 1970

[21] Appl. No.: 67,020

[30] Foreign Application Priority Data

Sept. 4, 1969  Switzerland.......................13407/69

[52] U.S. Cl. ......................425/4, 425/208, 425/245, 259/191
[51] Int. Cl. .............................................B29d 27/04
[58] Field of Search ..................18/5 P, 12 F, 12 SA, 18/12 SF, 30 SQ, 30 SS, 30 SR; 425/4, 817, 242, 245

[56] References Cited

UNITED STATES PATENTS 3,226,766  1/1966  Zelewski et al...............18/12 SE UX
3,263,276  8/1966  Maier ..............................18/12 SA X
3,391,051  7/1968  Ehrenfreund et al...........18/12 F UX

FOREIGN PATENTS OR APPLICATIONS 230,910  4/1960  Australia............................18/30 SQ Primary Examiner—H. A. Kilby, Jr.
Attorney—McGlew & Toren

[57] ABSTRACT

In the formation of plastic objects having an imporous dense film-like surface enclosing a foam-like porous core, the plastic material and an expanding agent are mixed, heated to a hot plastic compound, and transported through an enclosed axially elongated passageway by a threaded screw member. The threaded screw member is shaped to provide a flow path of variable transverse cross sectional area along its length. By axially displacing the screw member, dosed amounts of hot plastic compound, collected at the outlet end of the passageway, can be extruded for injection into a mold.

14 Claims, 2 Drawing Figures

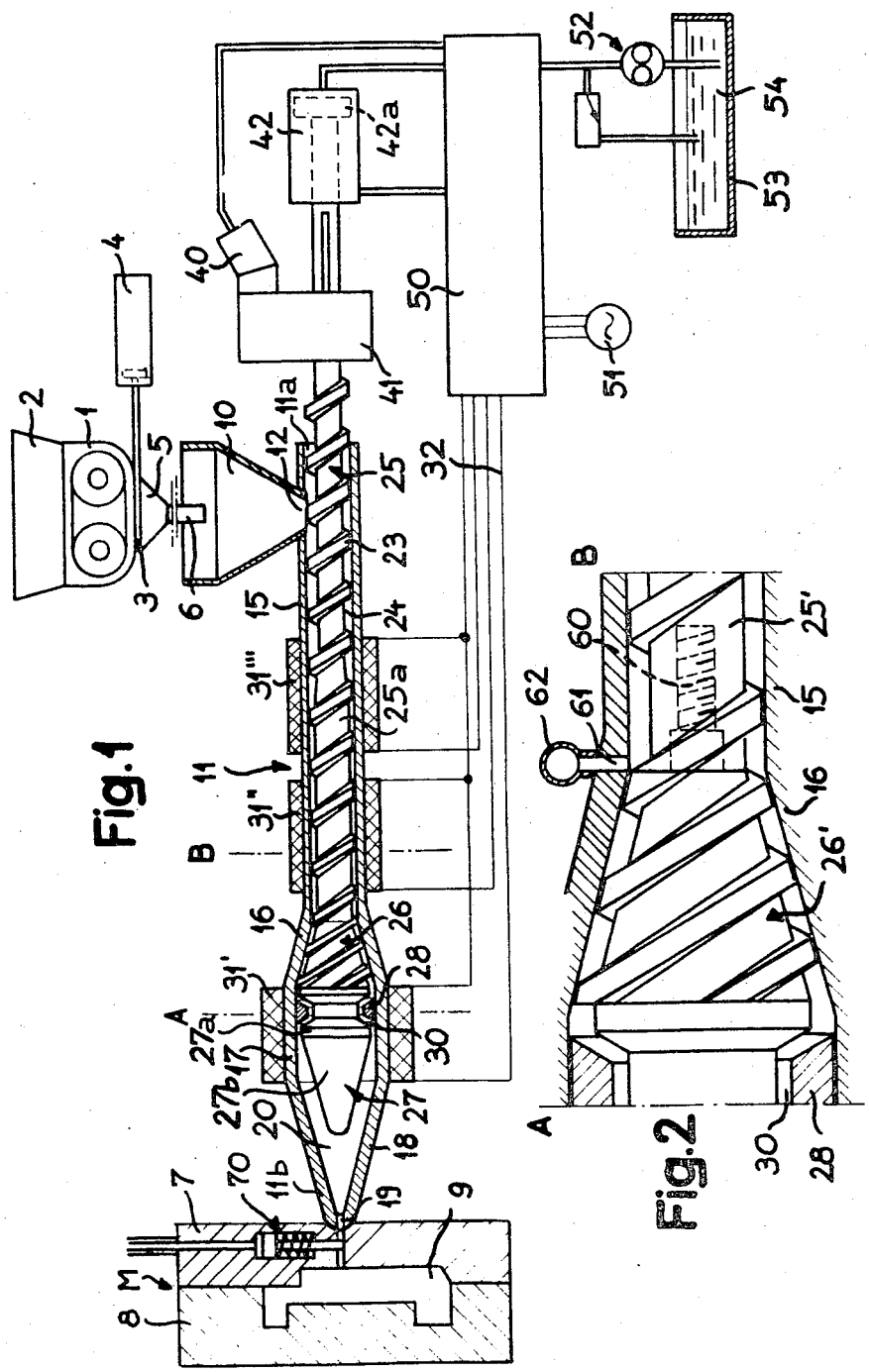

APPARATUS FOR THE INJECTION MOLDING OF PLASTIC OBJECTS

SUMMARY OF THE INVENTION

The present invention is directed to apparatus for the injection molding of plastic objects and, more particularly, it is directed to an arrangement for mixing, heating, and transporting the materials forming a plastic compound within an elongated passageway by means of a threaded screw member. The plastic objects injection molded from the materials processed through this method and apparatus have an imporous dense film skin enclosing a foam-like porous core.

In the past, it has been suggested to melt the materials for the production of such plastic objects, normally referred to as foamed objects, and to inject the melted materials along with a foaming agent in gaseous form into a mold. This injection molding process proved complicated in practice and was not completely satisfactory, because it was not possible to obtain a substantially homogeneous distribution of the foaming agent in the melted plastic materials.

Based on this disadvantage, the plastic material and the foaming agent were mixed in dry form and the mixture was subsequently melted and charged into a mold. In the production of foamed objects, mold cavities are frequently filled with a foam plastic. Accordingly, a method was selected where the melted materials were prepared in an extruder and supplied into a vessel containing a piston and, subsequently, the melted material was extruded from the vessel into the mold by displacement of the piston.

In contrast to conventional injection molding of homogeneous dense objects formed of thermoplastic materials, the injection forces are partly much lower depending on the desired form of the skin or surface of the object.

From these findings, it was concluded that the conventional injection molding process could be used for the production of these structurally new objects by utilizing different parameters. However, considerable difficulties were encountered, contrary to expectation, since either the processing cycles were uneconomical, due to the poor relationship between the plasticizing unit and the size of the object being formed, or because no satisfactory relationship could be established between the plasticizing energy and the injection energy. Therefore, the primary object of the present invention is to overcome the difficulties experienced in the prior art by melting the plastic material and the extending agent necessary for the production of the foam-like porous core structure and by supplying dosed amounts of the mixed material for use in injection molding. The mixing and heating of the materials is accomplished by a threaded screw member which is both rotatable and axially displaceable within an elongated passageway from which the hot-plastic compound is extruded.

In accordance with the present invention the materials required for the plastic compound are melted at the inlet end of the passageway containing the screw member.

In another embodiment of the invention, the materials can be melted by simultaneously rotating and retracting the screw member while the hot plastic compound accumulates adjacent the outlet end of the passageway.

Further, the apparatus in accordance with the present invention provides a hot plastic compound for an injection molding operation in which plastic objects are formed having an inporous dense film surface or skin which encloses a substantially uniform foam-like porous core. The plastic material and the extending agent are changed as a mixture or separately into an elongated passageway containing a threaded screw member which extends from the inlet end of the passageway to a position spaced closely from its outlet end from which the hot plastic compound is delivered into a mold. The threaded screw member is rotatable and axially displaceable within the passageway and the groove portions of the screw member between its threads have a variable transverse cross sectional area along the length of the screw member with the transverse cross sectional area decreasing in the direction of flow of the material along the screw member. The passageway is formed by a first wall section having a cylindrical shape and a second wall section forming the collecting chamber and outlet end of the passageway. The second wall section contains, in series, a diverging transition section connected to the first wall section, a cylindrical section and a conical section with the outlet for the hot plastic compound located at the apex of the conical section. The screw member is threaded for its full extent within the first wall section and for the portion of its length located within the transition section of the second wall section. The threaded length of the screw member has an outside diameter which corresponds substantially to the inside diameter of the first and second wall sections within which it is positioned. At its end adjacent the outlet end of the passageway, the screw member has a screw head extending axially from its threaded portion with a cylindrically shaped part extending from the threaded portion and a conically shaped part forming the end of the screw member within the outlet end of the passageway. The cylindrically shaped part of the screw head is located within the cylindrically shaped portion of the second wall section and has an axial length which is shorter than the axial length of the cylindrically shaped portion by a dimension equal to the maximum axial displacement path of the screw member within the passageway.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described preferred embodiments of the invention.

BRIEF DESCRIPTION OF THE DRAWING

FIG. 1 is a longitudinally extending view, partly in section, of an apparatus, in accordance with the present invention, for melting a plastic compound for delivery into an injection mold; and FIG. 2 is an enlarged detailed view, partly in section, of a portion of a second embodiment of the apparatus of the present invention, located between the lines A–B in FIG. 1.

DETAILED DESCRIPTION OF THE INVENTION

In FIG.1, an apparatus is shown for mixing and melting plastic materials for subsequent use in the injection molding of plastic objects which have an imporous dense film surface or skin enclosing a substantially uniform foam-like porous core. In forming the plastic compound for use in the injection molding operation, a mixture of plastic material and an expanding agent are introduced into a screw plasticizer unit 11 having an inlet end 11a and an outlet end 11b. Adjacent the inlet end 11a of the plasticizer unit 11 is a mixer 1 positioned below a hopper 2 with a slide valve 3 located within the lower portion of the mixer and associated with a slide valve actuator 4 for regulating the discharge from the mixer. Below the slide valve 3, an outlet 5 is connected to a line 6 which empties into a feed hopper 10 at the inlet end of the plasticizer unit 11. It is possible to feed the material from the mixer into the unit 11 either continuously or in selected charges.

To form the plastic objects with a dense surface film and a porous core, a divisible mold M is formed by mold halves 7 and 8 which, in combination, form a mold cavity 9 for the plastic objects. To move the mold halves 7 and 8 and thus open and close the mold M different mold closing devices can be utilized, that is hydraulic, hydraulic-mechanical or strictly mechanical types with suitable closing and locking elements for resisting the pressing forces. Within the outlet end 11b of the plasticizer unit 11, a collecting chamber 20 is provided from which the hot plastic compound is provided through a controllable shut-off device 70 into the mold cavity 9.

The plasticizer unit comprises a cylindrically shaped first wall section 15 which extends from the inlet end 11a to a second wall section composed of a frusto-conically shaped transition section 16, a cylindrically shaped collecting section 17 and a conically shaped head portion 18 which forms the outlet end of the unit with a nozzle 19 located at the apex of the head 18. Adjacent the inlet end 11a, an inlet opening 12 is provided through the first wall section 15 through which the materials are introduced into the unit 11. Due to the configuration of the various sections which make up the plasticizer unit 11, it has a plurality of different transverse cross sectional areas between its inlet opening 12 and its nozzle or outlet opening 19. At the outlet end 11b of the unit, a collection chamber 20 is located between the frusto-conical transition section 16 and the nozzle 19, and this chamber has a larger cross sectional area than exists in the passageway adjacent the inlet opening 12.

Extending axially through the first wall section and into the second wall section of the unit 11 is a plasticizing screw member 25 arranged both to rotate and to be axially displaced through the passageway. For its full extent within the first wall section 15 and within the transition section 16 of the second wall section, the screw member 25 comprises a core 25a and threads 23 extending outwardly from the core into sliding contact with the interior surface of the passageway so that grooves 24 are formed between the threads and outwardly from the surface of the core. As can be noted in FIG. 1, between the inlet opening 12 into the transition section 16 of the unit 11, the open flow path provided by the grooves 24 has a variable transverse cross sectional area with the area decreasing in the direction of flow. In addition to varying the diameter of the core 25a, the variable cross sectional areas can be provided by varying the pitch of the threads 23. The screw member 25 has an outlet end 26 of increased cross sectional size so that it corresponds to the configuration of the transition section 16 of the second wall section. As indicated in FIG. 1 the screw member is threaded for the extent of the transition section. It has been found advantageous to increase the number of threads on the screw 25 in the range of the transition section 16. Extending axially from the outlet end 26 of the threaded portion of the screw member is a head 27 which is comprised of a cylindrically shaped part 27a and a conically shaped part 27b extending from the cylindrically shaped part toward the outlet nozzle 19. The conically shaped part 27b of the head 27 has a configuration which corresponds substantially to the configuration of the inner surface of the conically shaped section 18 of the second wall section of the unit 11. Within the range of the cylindrically shaped part 27a of the head of the screw member a return flow block 28 is arranged extending inwardly from the inner surface of the cylindrically shaped section 17 into an annular shaped flow channel 30 formed in the cylindrically shaped part 27a. Under certain operating conditions the flow channel 30 connecting the end of the threaded section of the screw member with the collecting chamber 20 admits flow of the plastic compound into the collecting chamber. However the disposition of the return flow block within the flow channel interrupts any flow passage when the flow block bears tightly against the surface of the screw member 25 adjacent its outlet end 26.

On the exterior of the cylindrically shaped section 17 of the second wall section a heating sleeve 31' is positioned and, similarly, on the exterior surface of the first wall section 15 a pair of axially spaced heating sleeves 31'', 31''' are located. These heating sleeves are connected through lines 32 with a suitable energy source. Heating and/or cooling systems for use in injecting molding machines for thermoplastic and thermosetting materials are well known.

To rotate the screw member 25 within the passageway formed by the first and second wall sections, a hydraulic motor 40 is used which is connected to the screw member by a transmission 41. For the axial displacement of the screw member along with its outlet end 26 and head 27, a displacement cylinder 42 is utilized.

To operate the apparatus for the entire injection molding procedure, a control unit 50 is used which comprises all the control and regulating devices needed both for the movement and the thermal behavior of the apparatus. As shown in FIG. 1, this control unit is connected to an electric potential source 51 and to a pressure medium source 52 which, in turn, is associated with a tank 53 containing a pressure medium 54.

The following methods for the injection molding of plastic objects having a different surface and core structure can be carried out using the apparatus described above. The thermoplastic and thermosetting materials used in injection molding normally available in the form of granules and are mixed with the expanding agent in the plasticizing unit to a hot-plastic compound with either the plastic material and the expanding agent mixed as solids in a homogeneous blend, or with the plastic material having a uniformly distributed film of liquid expanding agent on its surface, or the expanding agent is mixed homogeneously with the plastic material before granulation with the result that the expanding agent is contained in the plastic granules to be processed. Any such mixture of plastic material and expanding agent is charged through the feed hopper 10 and the inlet opening 12 into the plasticizing unit 11. In this unit, the mixture is melted by the energy of the rotation imparted to the screw member 25 and by additional heaters, if necessary, which can be formed as sleeve elements 31', 31'' and 31''' located on the cylindrically shaped section 17 moving of the second wall section and on the first wall section 15. The melting process can be effected selectively in one of the following types of operations:

a. In the position of the screw member axially displaced toward the inlet end 11a and where the threads of the outlet end 26 of the screw member bear in sliding engagement against the inner surface of the transition section 16 of the passageway, the collecting chamber 20 is filled gradually with dosed amounts of the foamable plastic as the threaded screw member 25 rotates.

b. As the plastic compound is delivered into the collecting chamber 20 by the rotating threaded screw member 25 the accumulated material in the collecting chamber will effect a rearward displacement of the screw member if it is axially displaced toward the outlet end 11b of the passageway.

c. A control retracting movement of the screw member 25 can be carried out regardless of the progress of the filling of the collecting chamber 20, in order to secure, primarily before the end of the charging of a dosed amount into the collecting chamber, a final delivery of the plastic material from the range of the transition 16 into the range of the head end 27 of the screw member which is located within the collecting chamber 20.

As can be seen from the illustration in FIG. 1, the mixer 1 used in supplying the mixture of plastic material and expanding agent to the hopper 10 can be separated from the injection molding apparatus. It is not necessary to provide a delivery pipe from the mixer into the feed hopper of the molding apparatus, rather the charging of the mixture into the apparatus can be effected from a container.

After the specific amount or dosed quantity of the plastic material is delivered into the collecting chamber, which takes place with the shut-off element 70 in the closed position, by supplying hydraulic pressure to the displacement cylinder 42, a piston 42a (shown in dotted lines) which is connected to the screw member 25 axially displaces the screw member and, with the element 70 open, the hot plastic compound is extruded from the collecting chamber 20 into the mold cavity 9. During this portion of the operation, the annular shaped return flow block 28 bears against the surface of the outlet end 26 of the screw member and prevents any backflow of the hot plastic material through the flow channel 30 into the grooves 24 which form the flow path over the screw member. After the injection of the hot plastic compound into the mold, a new dosed quantity of the compound is advanced into the collecting chamber for the next injection operation.

The specific control measures in injection molding apparatus, such as the control of the heating or cooling in dependence on the temperature and/or on the torque absorbed by the screw member, the dynamic pressure on the piston 42a connected to the screw member in the displacement chamber 42, the speed of the screw member provided from the hydraulic driving motor 40 over the transmission 41 and the injection velocity are all effected in a known manner by the control unit 50.

The advantage of this arrangement is that the conventional plasticizer unit merely needs to be connected with a special second wall section having the transition section 16, the cylindrical section 17 and the conically shaped section 18 and with the head 27 and the outlet end 26 of the screw member shaped to correspond to the surfaces of the second wall section to carry out the present invention. With the driving power available in normal injection molding apparatus it is readily possible to plasticize the necessary amount of the foaming plastic material in the collecting chamber, which is generally larger compared to the normal injection molding space, without overloading it, and then to inject the material from the collecting chamber into the mold cavity using lower injecting forces for these molding methods. However, since lower injection molding forces are required, particularly as compared to conventional injection molding, the present unit suffices for the axial displacement of the screw member, despite the larger diameter of its outlet end 26. This arrangement has the result that the screw member is not overstressed by the torques which occur during the mixing or plasticization, or by the axial forces developed during the injection step, and no special control measures are required. To adapt the plasticizing unit 11 and its associated screw member 25 to different processing operations, it has been found advantageous to make the outlet end 26 and the head 27 screw member removable and exchangeable from the rest of the screw member body. Accordingly, as shown in FIG. 2, a outlet end 26' of the screw member along with the associated return flow block 28 which provides an open flow path 30 into the collecting chamber, can be replaceably connected to the remainder of the screw member by a threaded member 60 which is secured within the core of the threaded screw member 25'. With this arrangement, the entire unit can be adapted to different foaming plastic material processing operations. The foregoing description of the appparatus and methods for its use refer to the delivery of a mixture of plastic material and expanding agent into the plasticizer unit where the expanding agent adheres either as a liquid film on the plastic granules or is mixed as a powder with the plastic granules, or is uniformly displaced within the plastic granules.

It is possible to supply the expanding agent separately from the plastic material at a point along the plasticizing unit within which the threaded screw member rotates. The expanding agent can be charged into the unit either in solid, liquid or gaseous form. As shown in FIG. 2, an advantageous location for supplying the expanding agent is at the junction between the first and second wall sections at the point where the outlet end 26' of the screw member 25' diverges outwardly, at this particular location the plastic material is under pressure and an additional mixing takes place. One or several nozzles or inlet channels 61 are distributed about the circumference of the unit and extend inwardly from a feed pipe 62 for supplying the expanding agent. In certain plastic materials or expanding agents, may the advantageous to bring the expanding agent under pressure through a bore in the screw member and through a distributing device for charging the expanding agent into the plastic material contained in the grooves between the threads on the screw member. The distributing device can be arranged adjacent the inlet end of the unit or adjacent the outlet end of the threaded portion of the screw member, depending on the properties of the specific material or of the expanding agent, which would also be true for the use of inlet channels passing through the walls of the plasticizer unit.

With the method and apparatus described above, it it is possible to produce the requisite foamed objects without providing a special plastic material mixture in the form of granules and containing an expanding agent. Further, greater safety can be expected for the storage and handling of the separate plastic material and expanding agent.

What is claimed is:

1. Apparatus for intermittent fabrication of objects of limited volume, having an imporous dense film surface enclosing a foam-like porous core, by injection molding of plastic material being accumulated in a chamber and intermittently forced through a nozzle into a cavity, having a limited and wholly enclosed filling volume, of a split mold which can be opened in cadence with the intermittent fabrication of the objects, said apparatus comprising in combination, an elongated plasticization and injection cylinder extending from a material inlet to a material injection outlet communicating with said nozzle; and a plasticization and injection screw mounted in said cylinder for rotation and axial displacement therein and extending therethrough; said cylinder including a first elongated section, of substantially uniform diameter, extending from said material inlet, and a second section extending from said first section to said material injection outlet, and including an intermediate portion having a substantially uniform diameter larger than that of said first section, a frusto-conical transition portion diverging from said first section to said intermediate portion, and a further portion extending from said intermediate portion to said outlet; said further portion and at least a part of said intermediate portion constituting said chamber; said screw having a first threaded section with an outer diameter substantially equal to the inner diameter of said first cylinder section and extending through said first cylinder section, and a second section in said second cylinder section including an intermediate portion having an outer diameter substantially equal to the inner diameter of said second cylinder section intermediate portion, a transition-threaded section having an outer surface conforming to the inner surface of said transition portion of said cylinder second section, and further portion extending from said screw intermediate portion into said further portion of said second cylinder section; the axial length of said screw intermediate portion being less than the axial length of the intermediate portion of said second cylinder section; said screw being axially displaceable rearwardly in said cylinder, to obtain plasticization of the material, during accumulation of the material in said chamber and, after completion of plasticization of the material, being axially displaceable forwardly in said cylinder, to inject plasticized material, accumulated in said chamber, into said limited volume mold cavity.

2. Apparatus for injection molding plastic objects, as set forth in claim 1, wherein said screw intermediate portion has an annular groove therein; and an annular return flow block member positioned in said groove for limited axial displacement relative thereto; said return flow block member preventing return flow of the plastic material in the direction of the threaded portion of said screw when the material is being extruded from the outlet of said cylinder by axial displacement of said screw toward said outlet.

3. Apparatus for injection molding of plastic objects, as set forth in claim 1, wherein the threaded portion of said screw located within the frusto-conical portion of said second cylinder section has threads thereon for the extent of the axial dimension of the frusto-conical portion of said second cylinder section.

4. Apparatus for injection molding of plastic objects, as set forth in claim 2, wherein said return flow block member is spaced, in the direction of the outlet opening, from the end of the threaded portion of said screw within the frusto-conical portion of said second cylinder section, and said block member has an outside diameter corresponding to the inside diameter of said intermediate portion of said second cylinder section.

5. Apparatus for injection molding of plastic objects, as set forth in claim 1, wherein said second screw section is removable from and replaceable on said first screw section.

6. Apparatus for injection molding plastic objects, as set forth in claim 1, including a displacement member secured to said screw at its end adjacent said material inlet for axially displacing said screw both toward and away from said material injection outlet; and means operable to move said displacement member axially through selected axial distances in accordance with the parameters of the injection molding operation.

7. Apparatus for injection molding of plastic objects, as set forth in claim 6, wherein means are arranged for rotating said screw about its longitudinal axis and said displacement member is operative during the operation of said rotating means to inhibit axial displacement of said screw away from said material injection outlet way.

8. Apparatus for injection molding of plastic objects, as set forth in claim 1, wherein said first cylinder section has a first inlet opening spaced longitudinally from said second cylinder section for charging at least plastic material into said cylinder.

9. Apparatus for injection molding of plastic objects, as set forth in claim 8, wherein said first cylinder section has a second inlet opening spaced longitudinally from said first inlet opening toward said outlet for charging the expanding agent into said cylinder.

10. Apparatus for injection molding of plastic objects, as set forth in claim 9, wherein the second inlet opening within said first cylinder section is positioned adjacent to the junction of said first and second cylinder sections.

11. Apparatus for injection molding of plastic objects, as set forth in claim 1, wherein said screw member comprises a core and a continuous thread projecting outwardly from said core, said core having a variable diameter for at least a portion of its length increasing in the direction of the outlet, whereby the spaces defined between said core and the opposed surfaces of said thread and the inside surface of said cylinder vary along the axial direction of said screw.

12. Apparatus for injection molding plastic objects, as set forth in claim 1, wherein said further portion of said screw is frusto-conical and tapers toward said material injection outlet; said further portion of said second cylinder section being frusto-conical and converging toward said material injection outlet.

13. Apparatus for injection molding of plastic objects, as set forth in claim 1, wherein at least one heater sleeve is located on each of said first cylinder section and second cylinder section for supplying heat to the materials con-veyed through said cylinder by said screw.

14. Apparatus for injection molding plastic objects, as set forth in claim 1, wherein the axial length of said screw intermediate portion is less than the axial length of the intermediate portion of said second cylinder section by an amount equal to the maximum axial displacement of said screw in said cylinder.

* * * * *